United States Patent
Lee et al.

(10) Patent No.: US 11,436,492 B2
(45) Date of Patent: Sep. 6, 2022

(54) TRANSFER LEARNING OF DEEP NEURAL NETWORK FOR HVAC HEAT TRANSFER DYNAMICS

(71) Applicant: Johnson Controls Tyco IP Holdings LLP, Milwaukee, WI (US)

(72) Inventors: Young M. Lee, Old Westbury, NY (US); Zhanhong Jiang, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 213 days.

(21) Appl. No.: 16/868,337

(22) Filed: May 6, 2020

(65) Prior Publication Data

US 2020/0356857 A1  Nov. 12, 2020

Related U.S. Application Data

(60) Provisional application No. 62/844,660, filed on May 7, 2019.

(51) Int. Cl.
| | |
|---|---|
| *G06N 3/08* | (2006.01) |
| *G06N 3/04* | (2006.01) |
| *G05B 13/02* | (2006.01) |
| *F24F 11/64* | (2018.01) |
| *F24F 11/58* | (2018.01) |
| *F24F 11/54* | (2018.01) |

(52) U.S. Cl.
CPC ............. *G06N 3/08* (2013.01); *F24F 11/54* (2018.01); *F24F 11/58* (2018.01); *F24F 11/64* (2018.01); *G05B 13/027* (2013.01); *G06N 3/0445* (2013.01)

(58) Field of Classification Search
CPC ...... G06N 3/08; G06N 3/0445; G06N 3/0481; G06N 3/0454; F24F 11/54; F24F 11/58; F24F 11/64; G05B 13/027; G05B 2219/25255; G05B 15/02; G05B 2219/2614

See application file for complete search history.

(56) References Cited

U.S. PATENT DOCUMENTS

| | | | |
|---|---|---|---|
| 11,210,808 B2* | 12/2021 | Woods | G06F 3/0346 |
| 2018/0292098 A1* | 10/2018 | Bandyopadhyay | F24F 11/30 |
| 2019/0041811 A1* | 2/2019 | Drees | G06K 9/00496 |
| 2019/0354071 A1* | 11/2019 | Turney | G06N 3/0454 |
| 2020/0356857 A1* | 11/2020 | Lee | G06N 3/0445 |
| 2020/0380387 A1* | 12/2020 | Pourmohammad | G06N 5/04 |
| 2021/0190364 A1* | 6/2021 | Lee | F24F 11/47 |
| 2021/0191342 A1* | 6/2021 | Lee | G05B 13/0265 |
| 2022/0108262 A1* | 4/2022 | Cella | G05B 19/41885 |

* cited by examiner

*Primary Examiner* — Ramesh B Patel
(74) *Attorney, Agent, or Firm* — Foley & Lardner LLP

(57) ABSTRACT

A method includes collecting a first dataset of input-output data for a first building, training a deep learning model using the first dataset, initializing parameters of a target model for a second building using parameters of the deep learning model, collecting a second dataset of input-output data for a second building, training the target model for the second building using the initialized parameters of the target model and the second dataset, and controlling building equipment using the target model. Controlling the building equipment affects a variable state or condition of the building.

20 Claims, 10 Drawing Sheets

LSTM S2S model pre-trained and adapted between source and target domains

TRANSFER LEARNING OF DEEP NEURAL NETWORK FOR HVAC HEAT TRANSFER DYNAMICS

CROSS-REFERENCE TO RELATED PATENT APPLICATIONS

This application claims benefit of and priority to U.S. Provisional Patent Application Ser. No. 62/844,660 filed on May 7, 2019, entitled "Transfer Learning of Deep Neural Network For HVAC Heat Transfer Dynamics," which is hereby incorporated by reference in its entirety.

BACKGROUND

The present disclosure relates generally to a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a method including collecting a first dataset of input-output data for a first building, training a deep learning model using the first dataset, initializing parameters of a target model for a second building using parameters of the deep learning model, collecting a second dataset of input-output data for a second building, training the target model for the second building using the initialized parameters of the target model and the second dataset, and controlling building equipment using the target model, wherein controlling the building equipment affects a variable state or condition of the building.

In some embodiments, the method further includes configuring the target model to predict future values of variable states or conditions of the second building.

In some embodiments, the method further includes a deep learning model that is a Long Short Term Memory Network based Sequence to Sequence model.

In some embodiments, the method further includes a first dataset that is larger than the second dataset.

In some embodiments, the method further includes a step for training a deep learning model using the first dataset that comprises performing a supervised learning step on a specific task related to a thermal dynamic feature of the first building.

In some embodiments, the method further includes controlling the building equipment using the target model comprises controlling the building equipment to perform a task similar to the specific task related to the dynamic feature of the first building.

In some embodiments, the method further includes the initializing parameters of the target model for the second building using parameters of the deep learning model comprises performing a task adaptation process.

In some embodiments, the method further includes periodically retraining the target model for the second building as more data is collected over time for the second building.

In some embodiments, the method further includes periodically retraining the target model comprises adjusting the target model to adapt to changes in thermal dynamic feature variables affecting the second building.

Another implementation of the present disclosure is a system. The system includes a first building management system configured to provide a first dataset relating to a first building, a second building management system configured to provide a second dataset relating to a second building, a training system configured to train a deep learning model using the first dataset, generate a target model by adapting the deep learning model to generate predictions relating to the second dataset by re-training the deep learning model using the second dataset, and provide the target model to the second building management system, the second building management system configured to control building equipment to affect an environmental attribute of the second building using the target model.

In some embodiments of the system, the system includes a training system comprising one or more cloud-based computing resources.

In some embodiments of the system, the environmental attribute comprises indoor air temperature.

In some embodiments of the system, the first building is older than the second building.

In some embodiments of the system, the first dataset is larger than the second dataset.

In some embodiments of the system, the training system is configured to apply a task adaptation procedure.

In some embodiments of the system, the deep learning model comprises a Long Short Term Memory Network based Sequence to Sequence model.

In some embodiments of the system, the target model is configured to generate predictions relating to an indoor air temperature of the second building.

In some embodiments of the system, the target model is configured to generate predictions relating to a level of energy consumption of the second building.

In some embodiments of the system, the deep learning model is a thermal model.

In some embodiments of the system, the training system is configured to execute pre-training of the deep learning model using through a supervised learning process on a specific task relating to the first building in a domain relevant to the second building.

DETAILED DESCRIPTION

Building HVAC Systems and Building Management Systems

Figure 1:
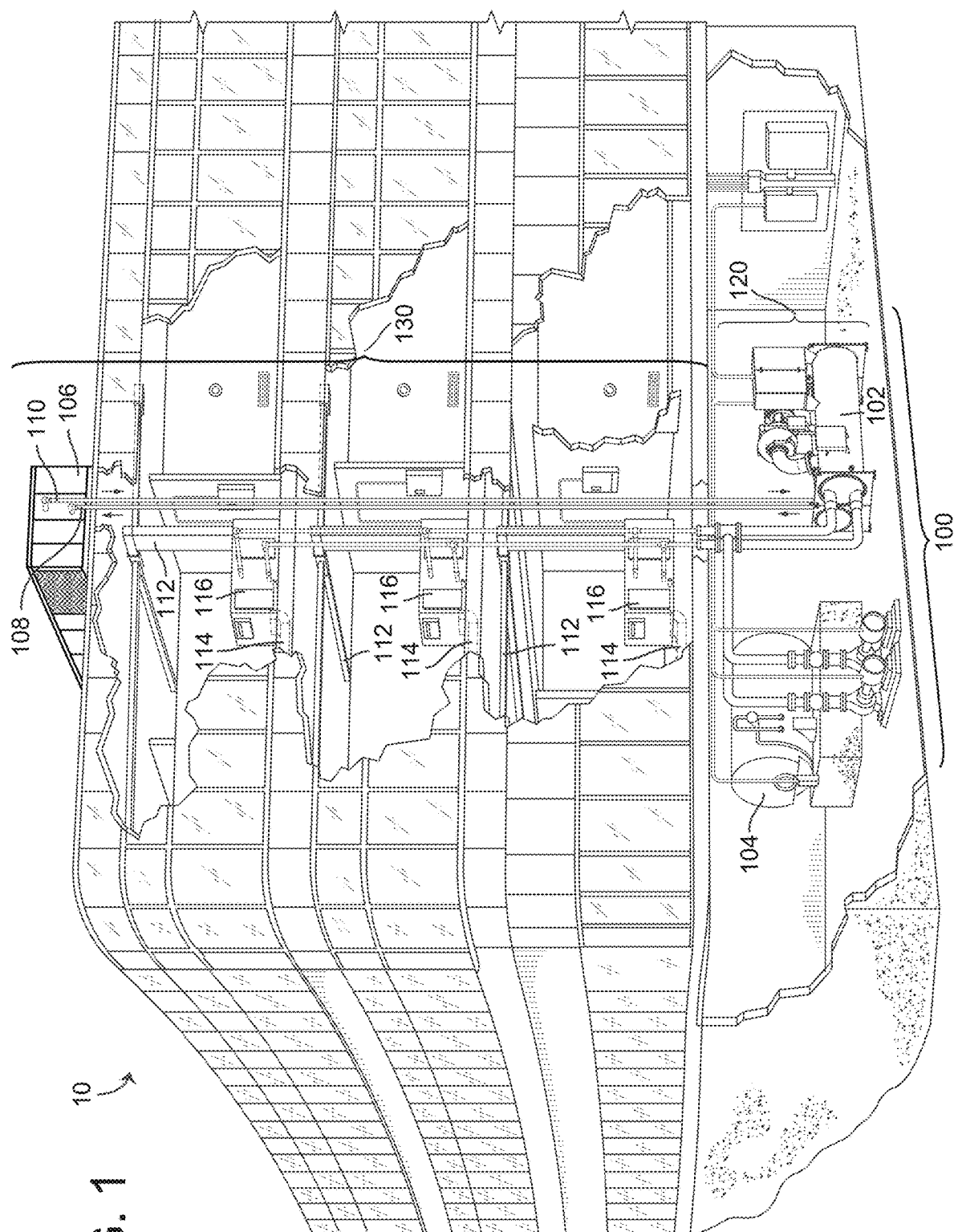
FIG. 1 is a drawing of a building equipped with a HVAC system, according to an exemplary embodiment.
Figure 2:
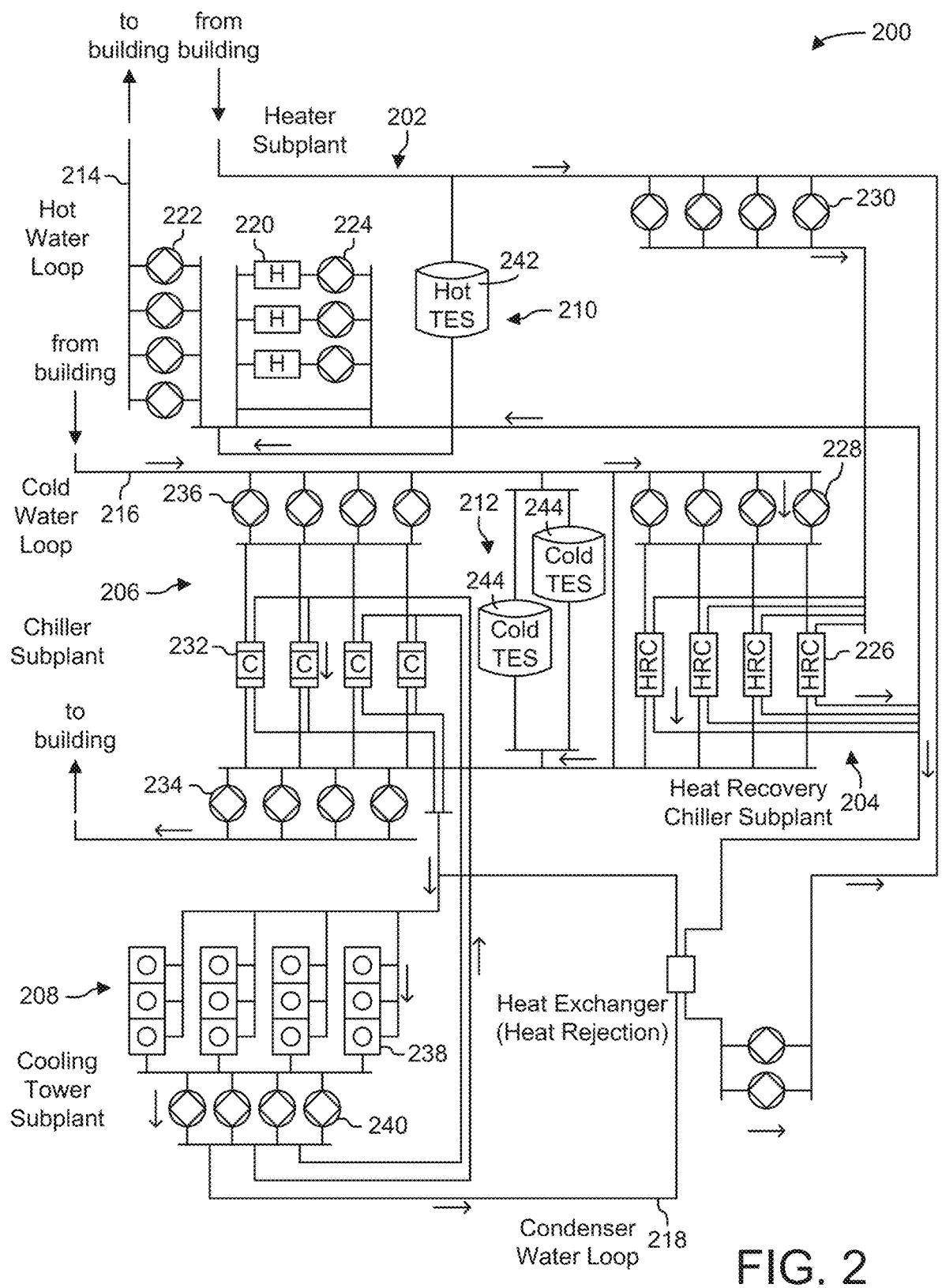
FIG. 2 is a block diagram of a waterside system which can be used to serve the building of FIG. 1, according to an exemplary embodiment.
Figure 3:
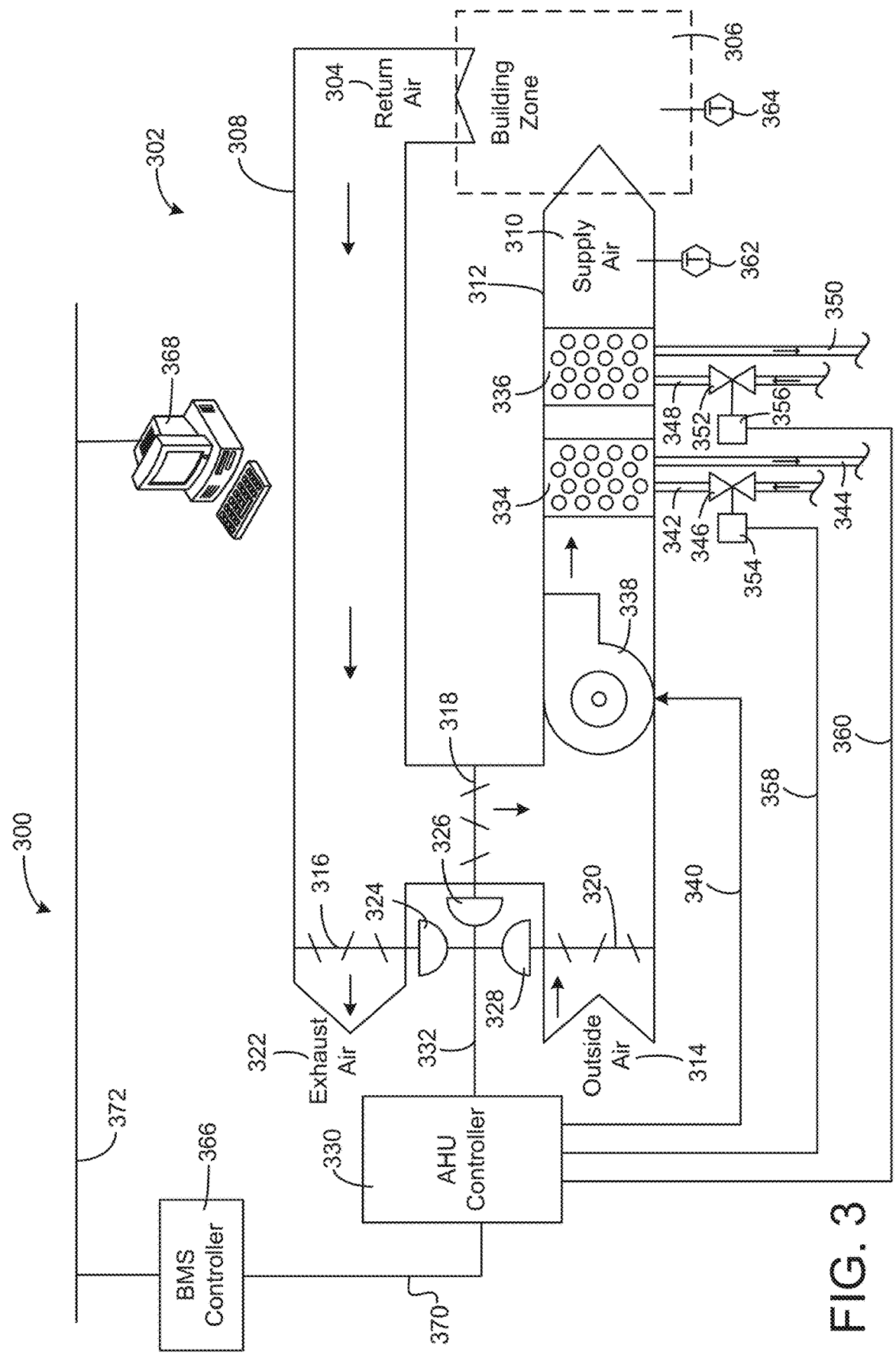
FIG. 3 is a block diagram of an airside system which can be used to serve the building of FIG. 1, according to an exemplary embodiment.
Figure 4:
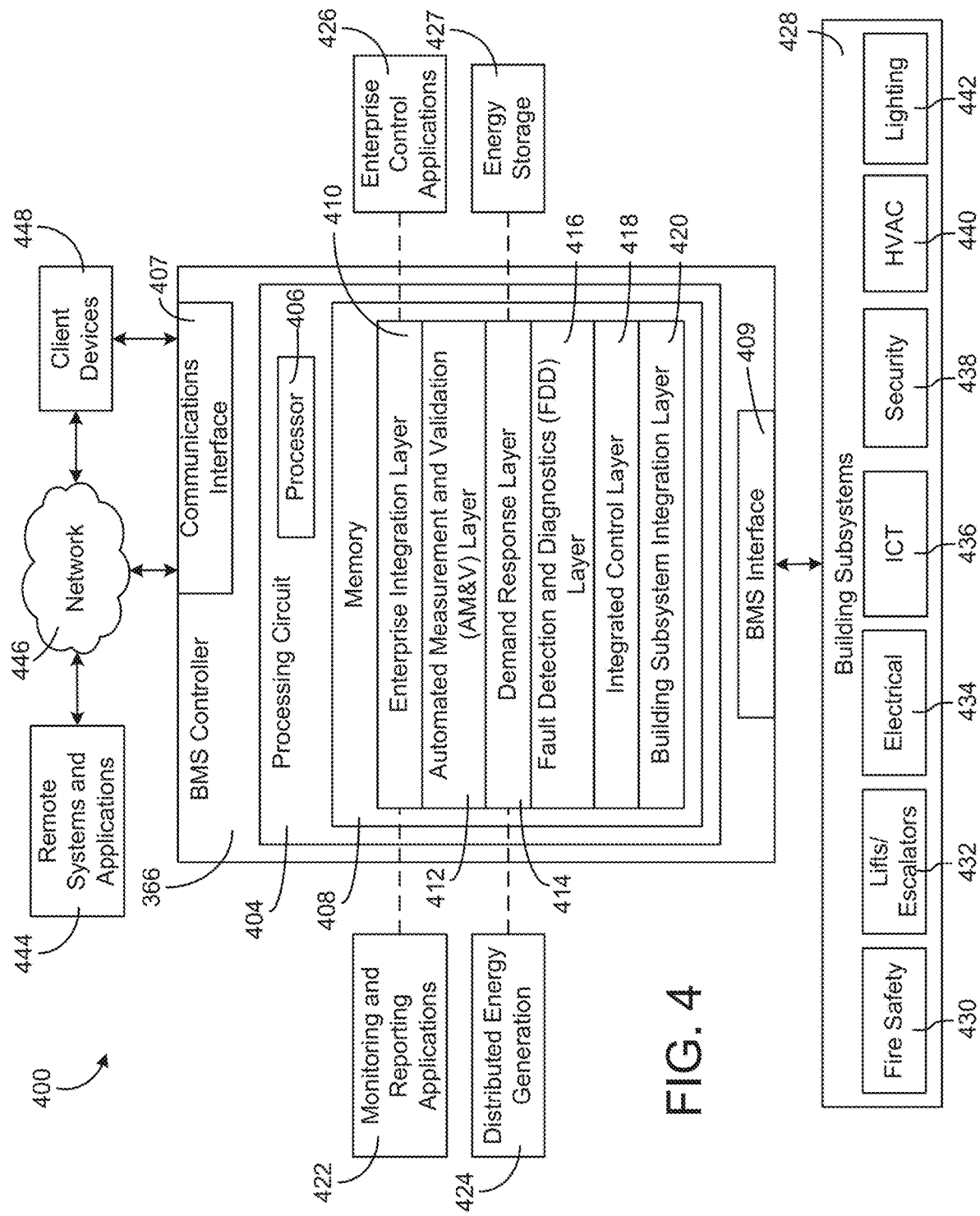
FIG. 4 is a block diagram of a building management system (BMS) which can be used to monitor and control the building of FIG. 1, according to an exemplary embodiment.
Figure 5:
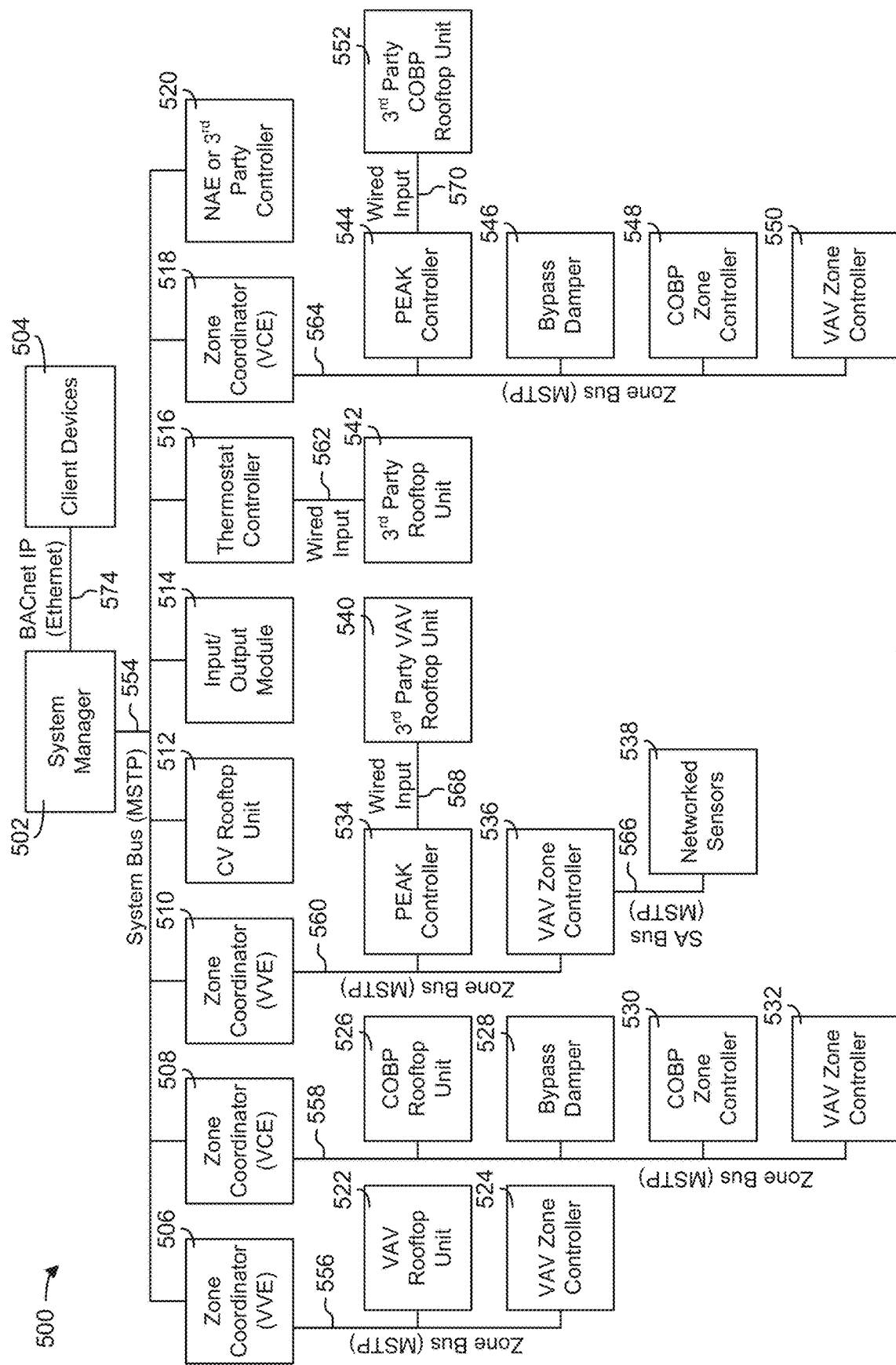
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively.

Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Building Management System with Transfer Learning of Deep Neural Network for HVAC Heat Transfer Dynamics Referring now to FIGS. 6-11, systems and methods for training thermal dynamics models for use with building management systems are shown, according to some embodiments.

Modern buildings have been of crucial importance in daily life for human's activities and can significantly affect the productivity, and physiological and psychological characteristics. One critical function, maintaining occupant thermal comfort in buildings, especially largescale commercial buildings, may heavily depend on the efficacy and efficiency of control and maintenance strategies for equipment (e.g. HVAC equipment as described above). Control strategies may require sufficiently adaptive environment models to capture the dynamics of thermal zones in buildings and adjusting for unknown disturbances either from internal or external factors.

When a large amount of historical building data is available for a particular building or campus, various data-driven models may be identified or trained using that historical data. However, the resulting model is typically specific to a particular building. Thus, if a model is desired for a new building (e.g., a newly constructed building, a newly purchased building, a building newly outfitted with a BMS), the model must be retrained from scratch using a large amount of historical data. However, sufficient data is often unavailable for the new building, potentially rendering it impossible to train a satisfactory model for the new building. To address this challenge, the present disclosure describes systems and methods for transferability of a data-driven models and learning from a first building (for which a large dataset is available) to a second building (for which only a limited dataset is available).

Figure 6:
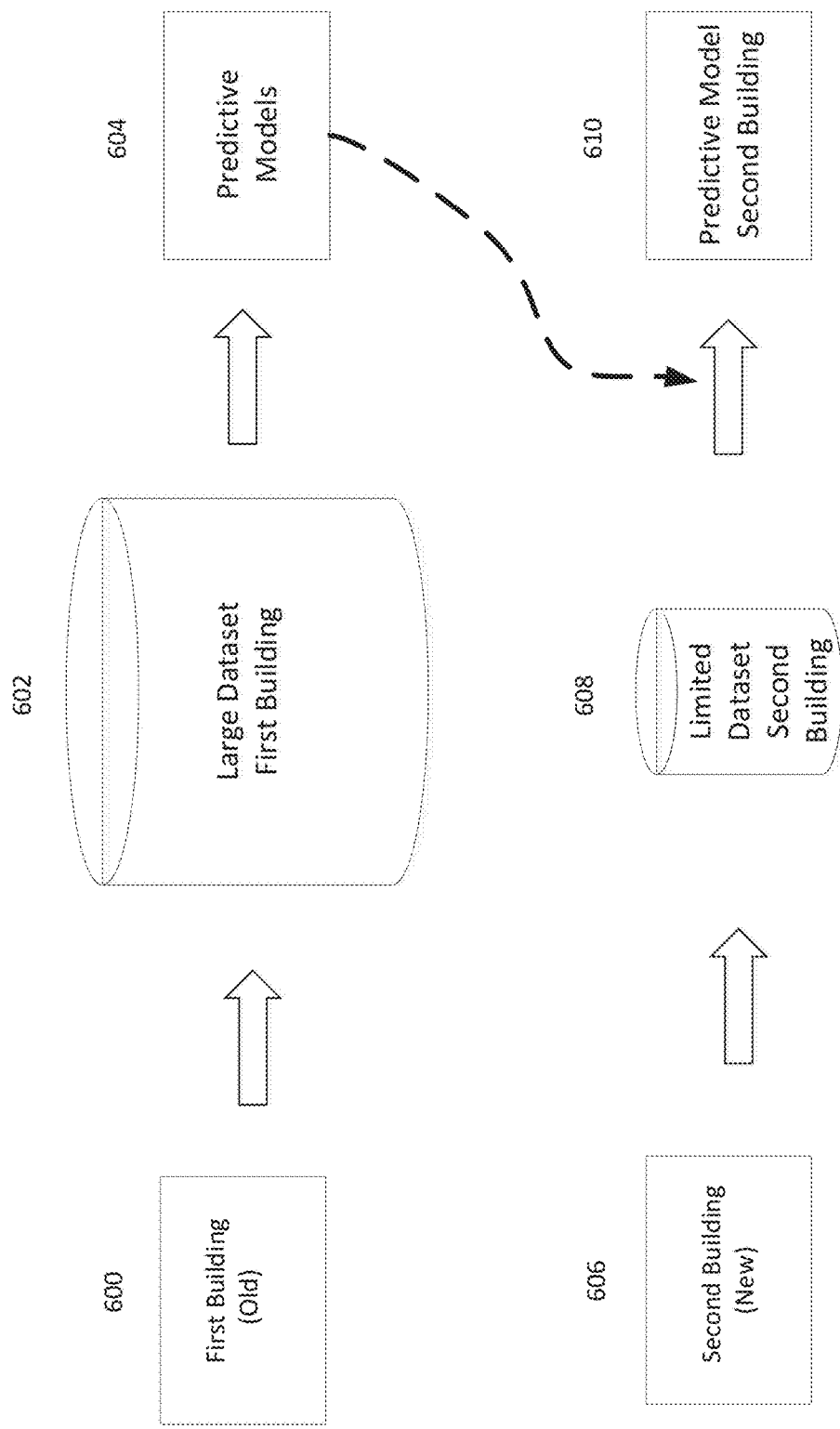
FIG. 6 is an illustration of transfer learning of deep neural networks for building dynamics, according to an exemplary embodiment.

FIG. 6 provides an overview of the systems and methods described herein. As shown in FIG. 6, a first (e.g., old) building 600 includes various sensors and equipment that have been generating data over a lifetime of the first building 600. Data for the building is collected in a large dataset 602. For example inputs to building equipment and measurements collected by sensors may be aggregated in the large dataset 602. Because the first building 600 has existed for a substantial amount of time, the large dataset 602 may reflect many possible conditions at the building and provide a robust dataset 602 on which a predictive model can be trained. Thus, as shown in FIG. 6, a predictive model can be obtained from the first building 600.

In contrast, a second building 606 (e.g., a new building) may have been operational (occupied, equipment operating, sensors collecting data) for a limited amount of time (i.e., much shorter than the lifetime of the first building 600). Thus, only a limited dataset 608 is available for the second building 606. The limited dataset 608 may include the same variables, points, etc. as the large dataset 602 and/or different variables, points, etc., but is limited to data from much fewer time steps.

As illustrated in FIG. 6, this application introduces systems and methods for transferring the predictive model(s) 604 derived for the first building 600 using the large dataset 602 and then re-training or fine-tuning the predictive model(s) to generate a predictive model for the second building 610. An accurate model for the second building 610 can thereby be obtained and used for online control of building equipment without the need to collect and wait for a large amount of data to be generated and collected for the second building 610. The present disclosure focuses on thermal models, e.g., models of temperature evolution, energy consumption, and thermal dynamics. In other embodiments, other variables may be used, for example humidity, pressure, airflow, or other variables of interest in buildings, campus, central plants, etc.

Figure 7:
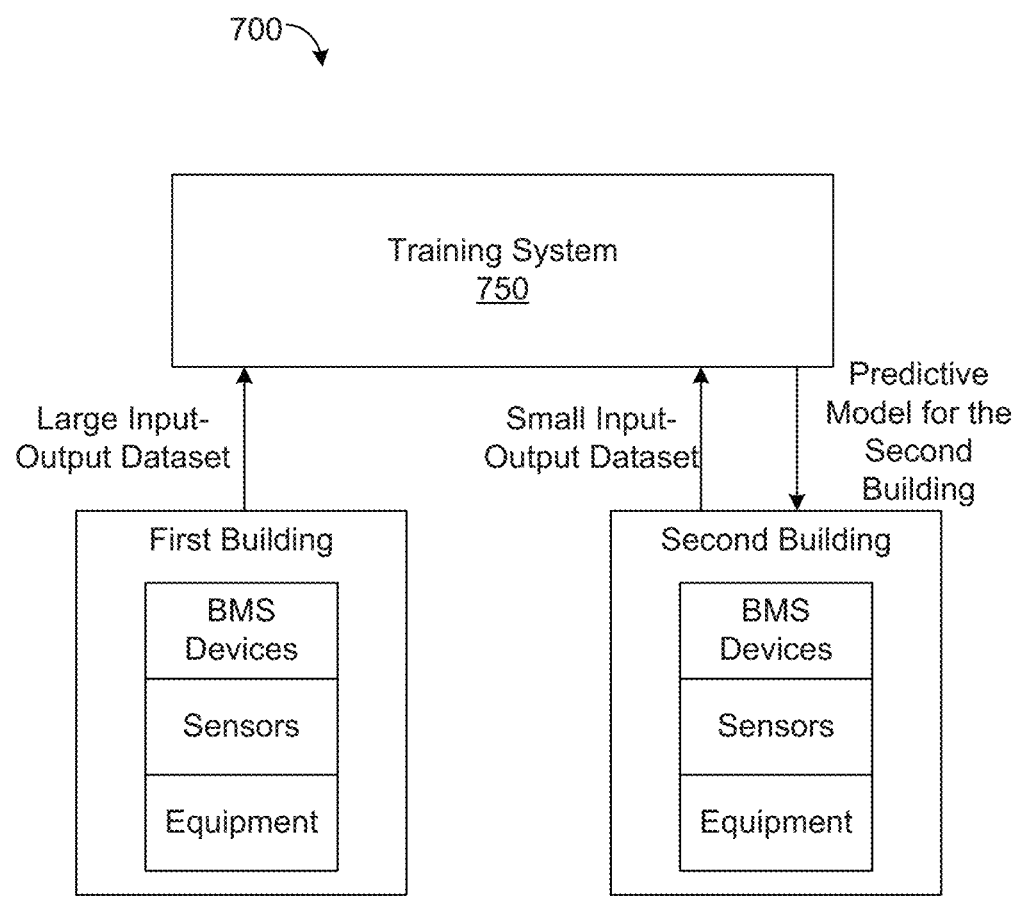
FIG. 7 is an illustration of a system for facilitating transfer learning of deep neural networks for building dynamics, according to an exemplary embodiment.

FIG. 7 provides an illustration of a system contemplated by the present disclosure, according to some embodiments. As shown in FIG. 7, the first building 600 includes various BMS devices, sensors, and equipment, for example as described above with reference to FIGS. 1-5. The BMS devices, sensors, and equipment of the first building 600 operate over time (e.g., over a long lifetime of the first building) to generate a large, historical dataset of input variables and output variables. The second building 606 also includes various BMS devices, sensors, and equipment, for example as described above with reference to FIGS. 1-5. The various BMS devices, sensors, and equipment of the second building 606 also operate over a shorter time (e.g., over a very short lifetime of the second/new building 606) to generate a small historical dataset of input variables and outputs variables. In the following description, the first building 600 is referred to as the "source" and the second building 606 is referred to as the "target." These datasets are provided to training system 750.

Accordingly, two datasets are generated which corresponding to the source S and the target T, and denoted as $D_S$ and $D_T$, respectively, where:

$$\mathcal{D}_S = \{(x_i^S, y_i^S)\}_{i=1}^m, \mathcal{D}_T = \{(x_j^T, y_j^T)\}_{j=1}^n$$

where x represents either source or target domain inputs, and y represents either source or target domain outputs. The subscript denotes a time step. The vector x may represent d inputs, i.e., such that $x_i \in \mathbb{R}^d$ is a vector of d values at time step i. The vector y may represent p outputs, i.e., such that $y_i \in \mathbb{R}^p$ is a vector of p values at time step i. For the reasons described above, the source dataset may be much larger than the target dataset, i.e., such that m>>n.

The two datasets represent the same or similar input variables x, for example outside air temperature, outside air relative humidity, indoor air temperature setpoint, supply air flow rate, etc. In some cases, the output variables y also represent the same or similar variables, for example, indoor air temperature, energy consumption, indoor air relative humidity, etc. Accordingly, a task adaptation approach is used herein.

The training system 750 of FIG. 7 is configured to apply a task adaptation approach to generate a model for the second (target) building. The training system 750 is configured to execute pre-training of a deep learning model using $D_S$ through a supervised learning manner with some specific task (e.g., relating to the first building). That model captures a rich set of thermal dynamics features, which can be useful for other tasks in the same domain (e.g., relating to the second building). The pre-trained model is adapted for the second building) from the pre-trained model using a new model using $D_T$ (e.g., via supervised learning). The training system 750 thereby generates a predictive model for the second building using the pre-trained model for the first building and the dataset for the second building. The training system 750 may accomplish this using the process 800 described below with reference to FIG. 8. The training system 750 can be implemented using cloud-computing resources (i.e., remote from either the first or second building) and/or local circuitry (e.g., located at the second building).

Figure 8:
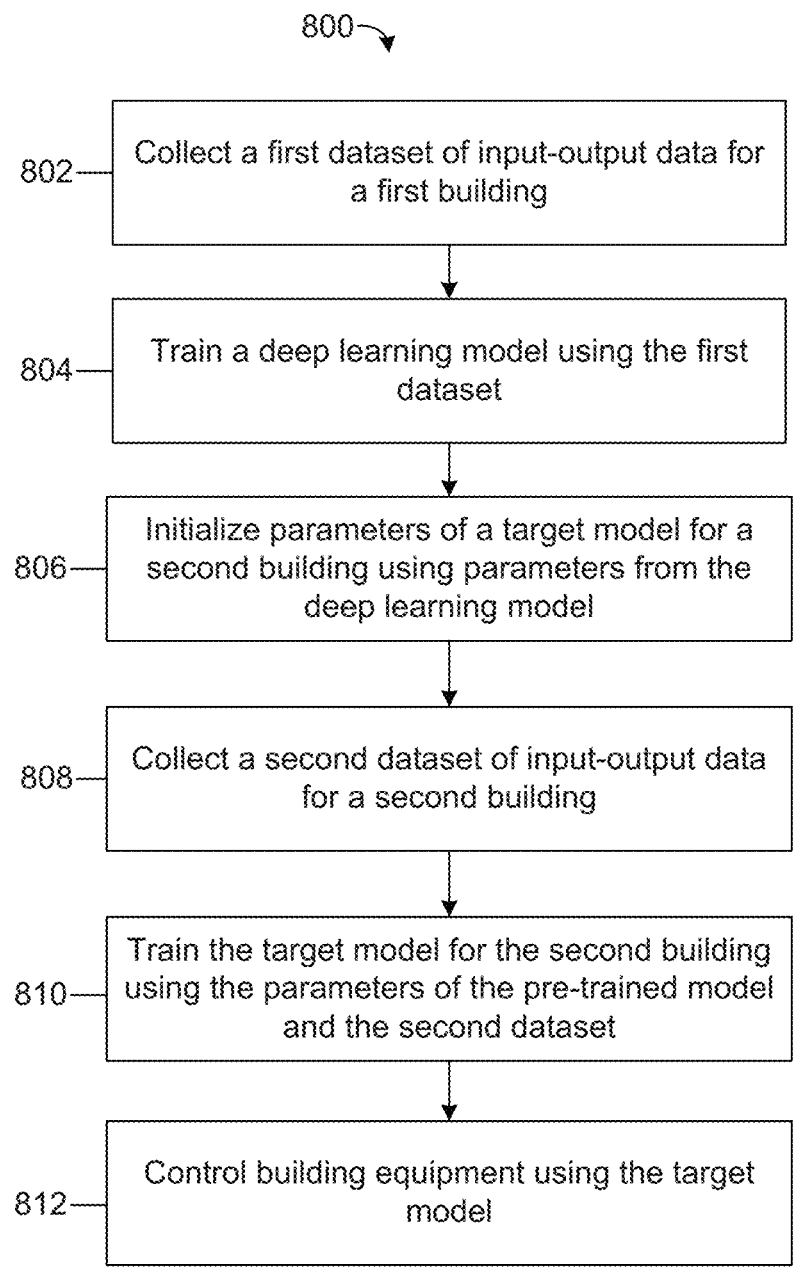
FIG. 8 is a flowchart of a process for transfer learning of deep neural networks for building dynamics, according to an exemplary embodiment.

Referring now to FIG. 8, a flowchart of a process 800 for transfer learning of deep neural network for HVAC heat transfer dynamics is shown, according to an exemplary embodiment. Process 800 can be executed by the training system 750 of FIG. 7. At step 802, a first dataset $D_S$ is collected from the first building.

Figure 9:
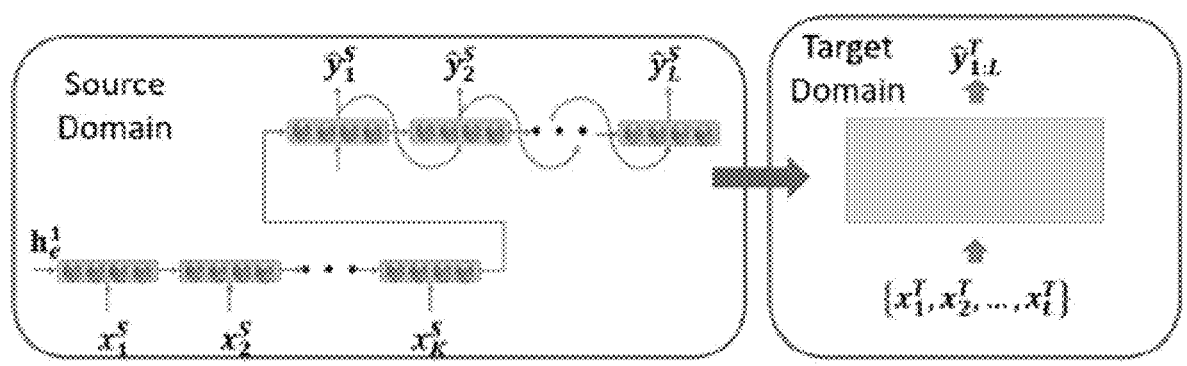
FIG. 9 is an illustration relating to transfer learning of deep neural networks for building dynamics, according to an exemplary embodiment.

At step 804, a deep learning model is trained using the first dataset. For example, the deep learning model may be a Long Short Term Memory Network based Sequence to Sequence (LSTM S2S) model. Using zone temperature evolution or energy consumption as a time series prediction task, the LSTM S2S is trained as a deep regressor using the large dataset $D_S$. That is, LSTM S2S architecture is adapted to map input $x_i^S \in D_S \ E \ D_S$ to output $y_i^S$. As shown in FIG. 9 according to one illustration, each input $x_i^S$ is encoded as a vector, which corresponds to the final hidden state of the encoder denoted by $h_e^K \in \mathbb{R}^c$, where c is the number of LSTM cell units in the hidden layer of the encoder. Then, $h_e^K$ is used as the initial state for activating the decoder, on top of which a dense layer with linear activations is used to recursively predict each time step in $y_i^S$. In various embodiments, teacher forcing or non-teacher forcing may be used. In the embodiments herein, non-teacher forcing is used.

The parameters of the network are obtained by minimize the mean square error loss given $\mathcal{L}_1$ via adaptive gradient descent methods:

$$h_e^k = f_e(W_{hh,S} h_e^{k-1} + W_{hx,S} x_{k-1}) \quad (1)$$

$$h_d^l = f_d(W'_{hh,S} h_d^{l-1}) \quad (2)$$

$$\hat{y}_l = g_d(W'_{yh,S} h_d^l + b_{d,S}) \quad (3)$$

$$\mathcal{L}_1(y_i^l, \hat{y}_i^l) = \frac{1}{n \times L} \sum_i^n \sum_{l=1}^L |y_i^l - \hat{y}_i^l|^2 \quad (4)$$

The equations (1), (2), (3) respectively indicate that representations of encoder, decoder, and dense layers of the LSTM S2S model. Equation (4) shows the mean square error between the ground truth (i.e., the output in the dataset $D_S$) and the predicted outputs generated by the LSTM S2S model. $W_{hh,S}$, $W_{hx,S}$, $W'_{hh,S}$, $W'_{yh,S}$, $b_{d,S}$ are the parameters for encoder, decoder, and dense layers. $g_d$ is given without loss of generality, and may be linear, for example.

In other words, at step 804, the parameters $W_{hh,S}$, $W_{hx,S}$, $W'_{hh,S}$, $W'_{yh,S}$, $b_{d,S}$ are determined as the parameters that minimize the prediction error of the LSTM S2S model using the large dataset from the first building.

At step 806, the parameters $W_{hh,S}$, $W_{hx,S}$, $W'_{hh,S}$, $W'_{yh,S}$, $b_{d,S}$ of the LSTM S2S model of step 804 are used to initialize a target model for the second (target) building. For example, the initial target model may be the same as the model generated at step 804.

At step 808, a small dataset of input-output data is collected for the second building. In some embodiments, a system identification experiment is run for the second building. For example, temperature setpoints or other input controls for equipment of the second building may be deliberately varied across a range of values and/or in a particular pattern to test temperature or energy consumption dynamics across a range of scenarios. Such a test may provide a relatively robust set of building data in a limited amount of time.

At step 810, the target model is trained from the second building using the parameters of the pre-trained model (from step 804) and the second dataset $D_T$. The entire whole model is re-trained using the second dataset $D_T$. The new parameters are denoted as $W_{hh,S}, W_{hx,S}, W'_{hh,S}, W'_{yh,S}, b_{d,S}$. The target model has the following time series prediction task:

$$\tilde{y}_l = g_d(W'_{yh,S} h_d^l + b_{d,T}).$$

The number of prediction time steps of each sample in the target building can be assumed to be the same as in the source building. Thus, the following loss given $\mathcal{L}_2$ can be immediately obtained as:

$$\mathcal{L}_2(y_j^l, \tilde{y}_j^l) = \frac{1}{m \times L} \sum_j^m \sum_{l=1}^L |y_j^l - \tilde{y}_j^l|^2.$$

By minimizing $\mathcal{L}_2$ with the limited amount of data in the second dataset $D_T$, the adapted model for the target building is acquired at step 810.

At step 812, building equipment is controlled using the target model. For example, the target model may be used in a model predictive control approach to generate temperature setpoints or other inputs that achieve occupant comfort while minimizing the cost of operating the building equipment over an optimization period. The building equipment is then operated in accordance with the temperature setpoints obtained using the target (adapted) model for the target (second) building.

In various embodiments, the target model obtained at step 810 is periodically retrained as more data is collected over time for the second building. Accordingly, the target model may improve over time and/or adjust over time to adapt to changes in building dynamics, seasonal weather, occupant behavior, etc.

Figure 10:
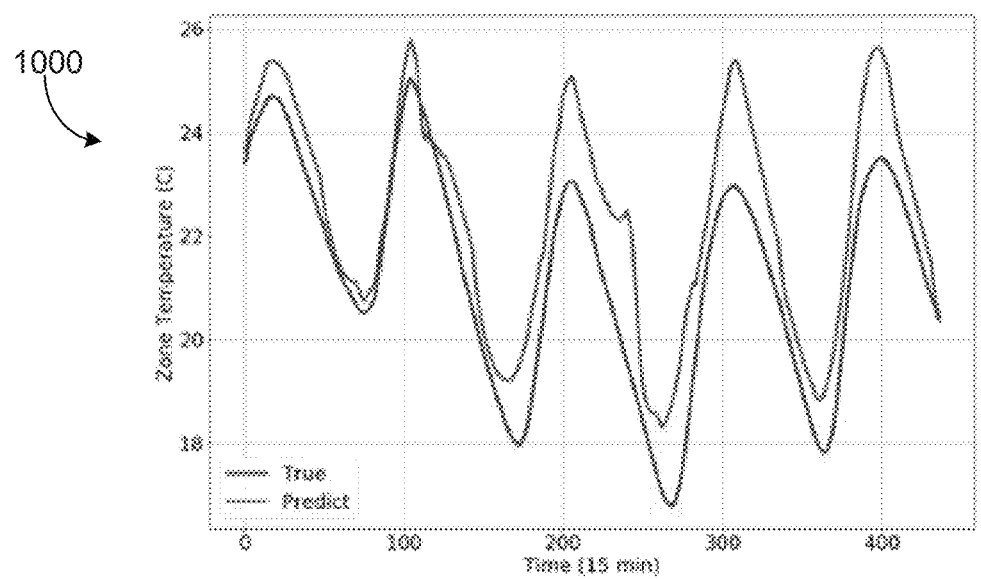
FIG. 10 is a pair of graphs illustrating experimental results that validate the advantages of the process of FIG. 8 and the system of FIG. 7.
Figure 10:
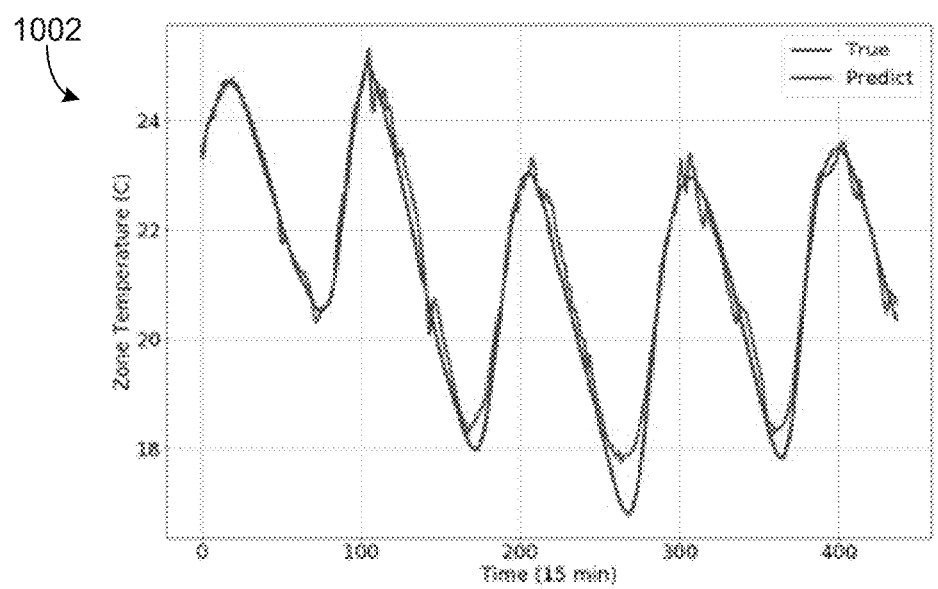

Referring now to FIG. 10, a pair of graphs illustrating experimental results relating to the systems and methods described herein are shown. In the experiment of FIG. 10, a first data set having 1373 samples collected 15 minutes apart was used for the target dataset $D_T$ while a second dataset having 35,098 samples collected at one minute intervals was used for the source dataset $D_S$. In the experiment of FIG. 10, the architecture for the LSTM S2S model has one LSTM layer for the encoder and one LSTM layer for the decoder. A mini-batch stochastic optimization based on Adam optimizer was used to pre-train the LSTM S2S model (using $D_S$) and to fine-tune the parameters for the target mode (using $D_T$). Hyperparameters were set based upon the optimal performance that was obtained.

FIG. 10 shows a first graph 1000 that shows predicted and actual values of zone temperature, where the predicted values were obtained using a model that was trained only using the small, target dataset $D_T$. FIG. 10 also shows a second graph 1002 that shows predicted and actual values of zone temperature, where the predicted values were obtained using the process of FIG. 8, i.e., the model pre-trained using the source dataset before being adapted for the target building. As can be clearly seen from FIG. 10, the adapted model of the second graph 1002 performs much better than the model trained only on data from the target building. Improved predictions may facilitate improved control of building equipment, improved occupant comfort, reduced cost, and improved metrics or other analytics relating to the building. FIG. 10 illustrates that all such advantages are made possible by the systems and methods of the present disclosure.

Although the experiment of FIG. 10 relates to indoor air temperature, it should be understood that predictions of various other variables is also possible. For example, the predictive models described herein may be configured to directly predict energy consumption. In some embodiments, a model may be first trained to predict temperature, and then adapted as described herein to predict energy consumption (or vice versa), for example by altering the task of the LSTM S2S model. In some embodiments of the systems and methods described herein, one or more of the input or output variables used in the model for the first building may be different from, added to, omitted from, etc. the set of input or output variables for the second building. The model is sufficient adaptable to allow for the transferred learning described herein in various such scenarios. These and many other variations are contemplated by the present disclosure.

CONFIGURATION OF EXEMPLARY EMBODIMENTS

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A method, comprising:
    collecting a first dataset of input-output data for a first building;
    training a deep learning model using the first dataset;
    initializing parameters of a target model for a second building using parameters of the deep learning model;
    collecting a second dataset of input-output data for a second building;
    training the target model for the second building using the initialized parameters of the target model and the second dataset; and
    controlling building equipment using the target model, wherein controlling the building equipment affects a variable state or condition of the building.

2. The method of claim 1, wherein the target model is configured to predict future values of variable states or conditions of the second building.

3. The method of claim 1, wherein the deep learning model is a Long Short Term Memory Network based Sequence to Sequence model.

4. The method of claim 1, wherein the first dataset is larger than the second dataset.

5. The method of claim 1, wherein training a deep learning model using the first dataset comprises performing a supervised learning step on a specific task related to a thermal dynamic feature of the first building.

6. The method of claim 5, wherein controlling the building equipment using the target model comprises controlling the building equipment to perform a task similar to the specific task related to the dynamic feature of the first building.

7. The method of claim 1, wherein the initializing parameters of the target model for the second building using parameters of the deep learning model comprises performing a task adaptation process.

8. The method of claim 1, further comprising periodically retraining the target model for the second building as more data is collected over time for the second building.

9. The method of claim 8, wherein periodically retraining the target model comprises adjusting the target model to adapt to changes in thermal dynamic feature variables affecting the second building.

10. A system, comprising:
a first building management system configured to provide a first dataset relating to a first building;
a second building management system configured to provide a second dataset relating to a second building;
a training system configured to:
   train a deep learning model using the first dataset;
   generate a target model by adapting the deep learning model to generate predictions relating to the second dataset by re-training the deep learning model using the second dataset; and
provide the target model to the second building management system, the second building management system configured to control building equipment to affect an environmental attribute of the second building using the target model.

11. The system of claim 10, wherein the training system comprises one or more cloud-based computing resources.

12. The system of claim 10, wherein the environmental attribute comprises indoor air temperature.

13. The system of claim 10, wherein the first building is older than the second building.

14. The system of claim 10, wherein the first dataset is larger than the second dataset.

15. The system of claim 10, wherein the training system is configured to apply a task adaptation procedure.

16. The system of claim 10, wherein the deep learning model comprises a Long Short Term Memory Network based Sequence to Sequence model.

17. The system of claim 10, wherein the target model is configured to generate predictions relating to an indoor air temperature of the second building.

18. The system of claim 10, wherein the target model is configured to generate predictions relating to a level of energy consumption of the second building.

19. The system of claim 10, wherein the deep learning model is a thermal model.

20. The system of claim 10, wherein the training system is configured to execute pre-training of the deep learning model using a supervised learning process on a specific task relating to the first building in a domain relevant to the second building.

* * * * *